(12) United States Patent
Grattan

(10) Patent No.: US 11,338,861 B2
(45) Date of Patent: May 24, 2022

(54) VEHICLE ROOF STRUCTURE

(71) Applicant: Nissan North America, Inc., Franklin, TN (US)

(72) Inventor: Patrick Grattan, Wixom, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 0 days.

(21) Appl. No.: 17/014,819

(22) Filed: Sep. 8, 2020

(65) Prior Publication Data

US 2022/0073146 A1 Mar. 10, 2022

(51) Int. Cl.
*B62D 25/06* (2006.01)
*B60R 9/04* (2006.01)
*B62D 27/02* (2006.01)

(52) U.S. Cl.
CPC .............. *B62D 25/06* (2013.01); *B60R 9/04* (2013.01); *B62D 27/02* (2013.01); *B62D 27/023* (2013.01)

(58) Field of Classification Search
CPC ....... B62D 25/06; B62D 27/20; B62D 27/023
USPC .............. 296/203.01, 203.03, 210, 1.03
See application file for complete search history.

(56) References Cited

U.S. PATENT DOCUMENTS

| | | | |
|---|---|---|---|
| 6,397,553 B1 * | 6/2002 | Horikawa | B60R 21/04 296/187.05 |
| 6,578,909 B1 | 6/2003 | Reed et al. | |
| 7,758,107 B2 | 7/2010 | Ratsos et al. | |
| 8,042,863 B2 | 10/2011 | Nydam | |
| 8,998,307 B1 | 4/2015 | Joyce et al. | |
| 9,045,166 B2 | 6/2015 | Fellague | |
| 9,902,429 B2 | 2/2018 | Okada et al. | |

FOREIGN PATENT DOCUMENTS

| | | | |
|---|---|---|---|
| DE | 102013019591 | * | 5/2014 |
| WO | 2009052951 A1 | | 4/2009 |

* cited by examiner

*Primary Examiner* — Dennis H Pedder
(74) *Attorney, Agent, or Firm* — Global IP Counselors, LLP

(57) ABSTRACT

A vehicle roof structure includes a roof bow and a stiffening member. The roof bow has a main section with a forward flange section, a rearward flange section and a middle section that extend in a lengthwise direction of the roof bow. The stiffening member has a panel portion with a plurality of forward projections extending from a forward edge of the panel portion and a plurality of rearward projections extending from a rearward edge of the panel portion. The plurality of forward projections are fixedly attached to the forward flange section of the roof bow and the plurality of rearward projections are fixedly attached to the rearward flange section of the roof bow. The panel portion of the stiffening member is located between the forward flange section and the rearward flange section of the roof bow.

18 Claims, 8 Drawing Sheets

VEHICLE ROOF STRUCTURE

BACKGROUND

Field of the Invention

The present invention generally relates to a vehicle roof structure. More specifically, the present invention relates to a vehicle roof structure that includes a roof bow that includes a stiffening member.

Background Information

Large sports utility vehicles (SUVs), vans and panel trucks typically have large cavernous interior spaces that may or may not be part of a passenger compartment of the vehicle. Due the large nature of such interior spaces, the rearward areas of the structure that defines the large interior space can sometimes react to cornering (turning) of the vehicle by slightly elastically deforming in response to centrifugal forces. This reaction to cornering can provide the driver of the vehicle with a sense of unease. Further, the cavernous nature of such large interior spaces can often amplify noises, in particular in the rearward area of the interior space.

SUMMARY

One object of the present disclosure is to provide a rearward roof bow of a roof structure of a vehicle with a large interior space with a stiffening member that improves the driving experience of a driver operating the vehicle and reduces noises that would otherwise emanate from the rearward area of the large interior space.

Another object of the present disclosure is to provide a rearward roof bow of a roof structure of a vehicle with a large interior space with a stiffening member that improves and/or attenuates resonance frequency of the roof structure, improving the roof stiffness of the roof bow and improves ties to side roof rails for an improved ride, handling and solid structure feel of the vehicle.

In view of the state of the known technology, one aspect of the present disclosure is to provide a vehicle roof structure roof bow that includes a stiffening member. The roof bow is configured for attachment to a vehicle. The roof bow has a main section with a first end and a second end, a first overall length being measured from the first end to the second end and a first overall width being measured perpendicular to the first overall length. The main section has a forward flange section, a rearward flange section and a middle section that extend in a lengthwise direction of the roof bow between the first end and the second end. The forward and rearward directions are defined relative to a forward and rearward directions of the vehicle. The stiffening member has a panel portion with a first end and a second end, a second overall length being measured from the first end to the second end that is approximately equal to the first overall length and a second overall width being measured perpendicular to the second overall length. The first overall width of the roof bow is greater than the second overall width of the stiffening member. The panel portion has a plurality of forward projections extending from a forward edge of the panel portion at corresponding first predetermined locations and a plurality of rearward projections extending from a rearward edge of the panel portion at corresponding second predetermined locations. The plurality of forward projections are fixedly attached to the forward flange section of the roof bow. The plurality of rearward projections are fixedly attached to the rearward flange section of the roof bow such that the panel portion of the stiffening member is located between the forward flange section and the rearward flange section of the roof bow.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
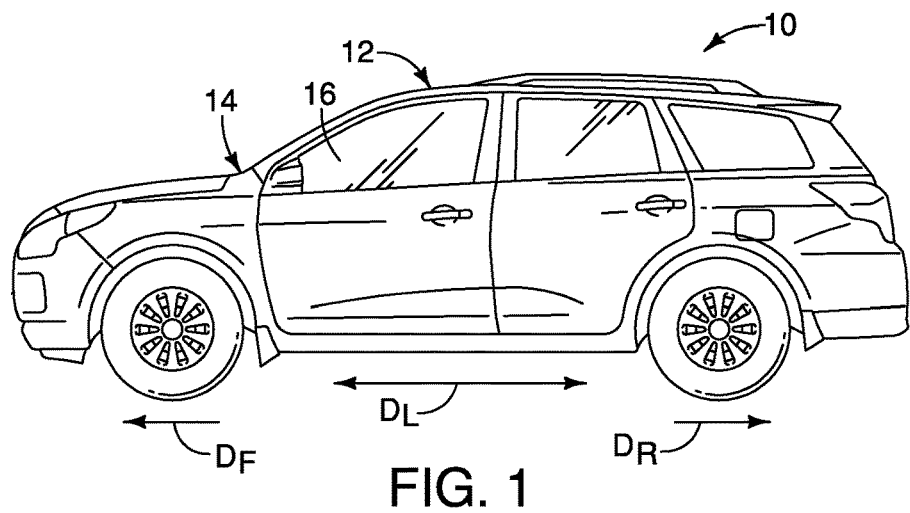
FIG. 1 is a side view of a vehicle that includes a roof structure in accordance with an exemplary embodiment.

Referring initially to FIG. 1, a vehicle 10 having a roof structure 12 is illustrated in accordance with a first embodiment.

The vehicle 10 is a large SUV (sports utility vehicle) that has a vehicle body structure 14 that includes, among other features, the roof structure 12. The vehicle body structure 14 further defines a passenger compartment 16. The vehicle 10 defines a vehicle longitudinal direction $D_L$, a vehicle forward direction DF and a vehicle rearward direction DR, all relative to the orientation of the vehicle 10, in a conventional manner.

Figure 2:
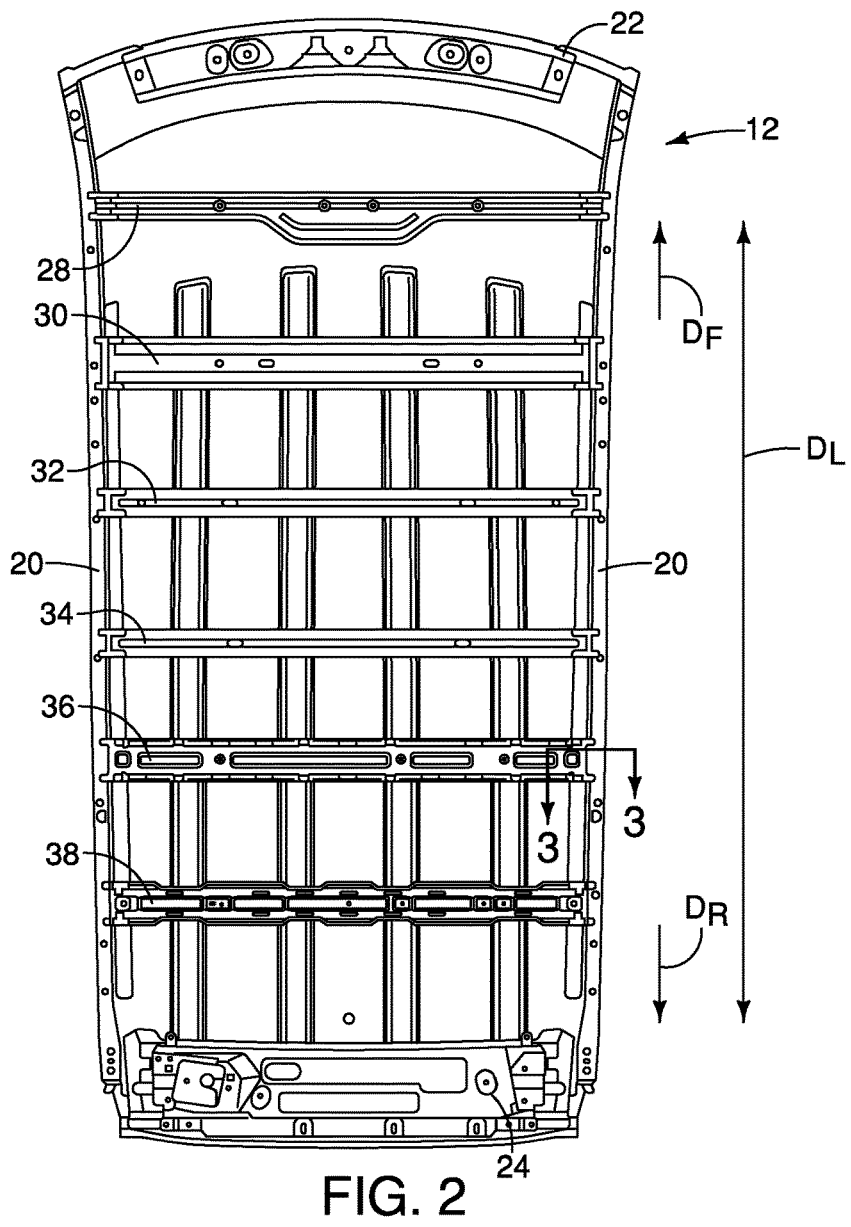
FIG. 2 is a top view of a plurality of roof bows of the roof structure with a roof panel of the roof structure removed in accordance with the exemplary embodiment.

As shown in FIG. 2, the roof structure 12 (also referred to as the vehicle roof structure 12) includes a pair of roof side rails 20, a windshield support structure 22, a rear support structure 24, a roof panel 26 and a plurality of roof bows, such as roof bows 28, 30, 32, 34, 36 and 38.

Figure 3:
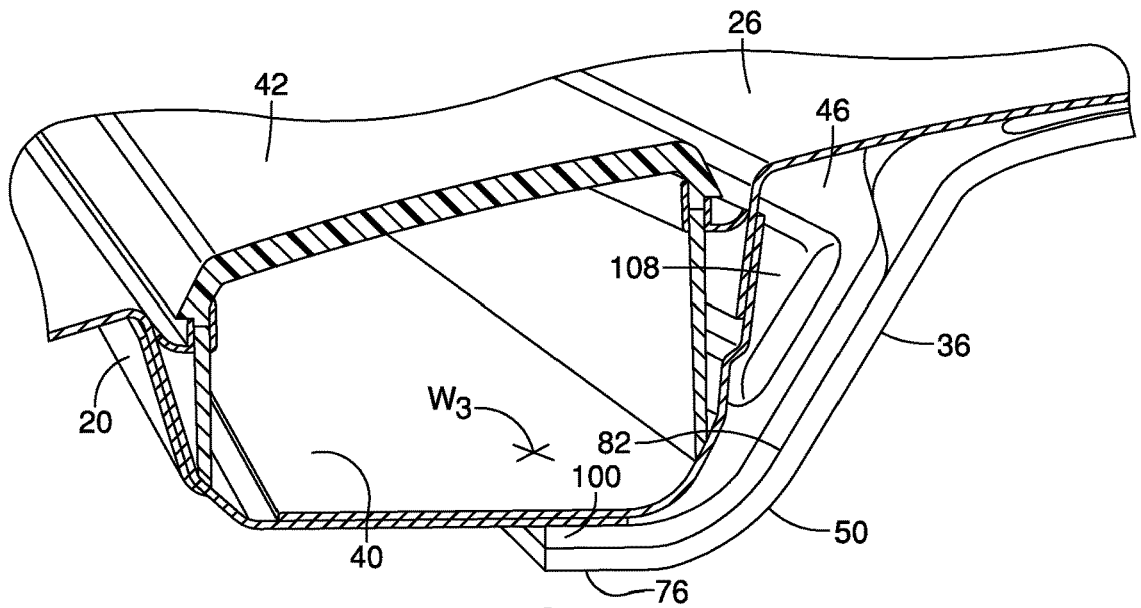
FIG. 3 is a cross-sectional view of a portion of the roof structure taken along the line 3-3 in FIG. 2 showing a roof ditch of the roof structure along with a welding connection between a side roof rail and one of the roof bows in the area of the roof ditch in accordance with the exemplary embodiment.

The pair of roof side rails 20 extend in the vehicle longitudinal direction $D_L$ along opposite sides of the vehicle 10 from the windshield support structure 22 to the tailgate support structure 26. The pair of roof side rails 20, portions of the roof rails 20 and the roof panel 26 at least partially defining roof ditches 40 on either lateral side of the roof panel 26, as shown in FIGS. 2 and 3. The roof ditches 40 are recessed areas of the roof structure 12 where the roof panel 26 is attached to the roof side rails 20 via, for example, welding techniques. The roof ditches 40 are concealed by molding assemblies 42, as shown in FIG. 3. Since roof side rails, roof panels, windshield support structures, tailgate support structures and roof ditches are conventional vehicle structures, further description is omitted for the sake of brevity.

As is described in greater detail below, the roof bows 28, 30, 32, 34, 36 and 38 are welded or otherwise fixedly attached to the roof side rails 20 at locations adjacent to and below the roof ditches 40, as shown in FIG. 3. The roof bows 28, 30, 32, 34, 36 and 38 are arranged as follows. The roof bow 28 is located proximate but spaced apart and rearward of the windshield support structure 22. The roof bow 30 is spaced apart and rearward of the roof bow 28. Similarly, the roof bow 32 is spaced apart and rearward of the roof bow 30. The roof bows 34, 36 and 38 are similarly spaced apart from one another with all of the roof bows 28, 30, 32, 34, 36 and 38 being forward of the rear support structure 24.

In convention SUVs or large vehicle with a long, large roof structure, the roof bows are often similar or identical, spanning the distance between side roof rails of the roof structure. In the roof structure 12 described herein below, the roof bows 28, 30, 32, 34, 36 and 38 are not identical. Rather, either one, or both, of the roof rails 36 and 38 have been redesigned in a manner that improves the overall design of the vehicle 10, as describe below.

In many large SUVs, with a large roof structure such as the roof structure 12, rear portions of the roof structure 12 can experience noises due to the resonant frequency of the structure and similarly, can experience booming noises when the top rear portion of the roof is hit or drummed on by the human hand. Further, the size and shape of the passenger compartment 16 can be very large and almost cavernous.

Figure 4:
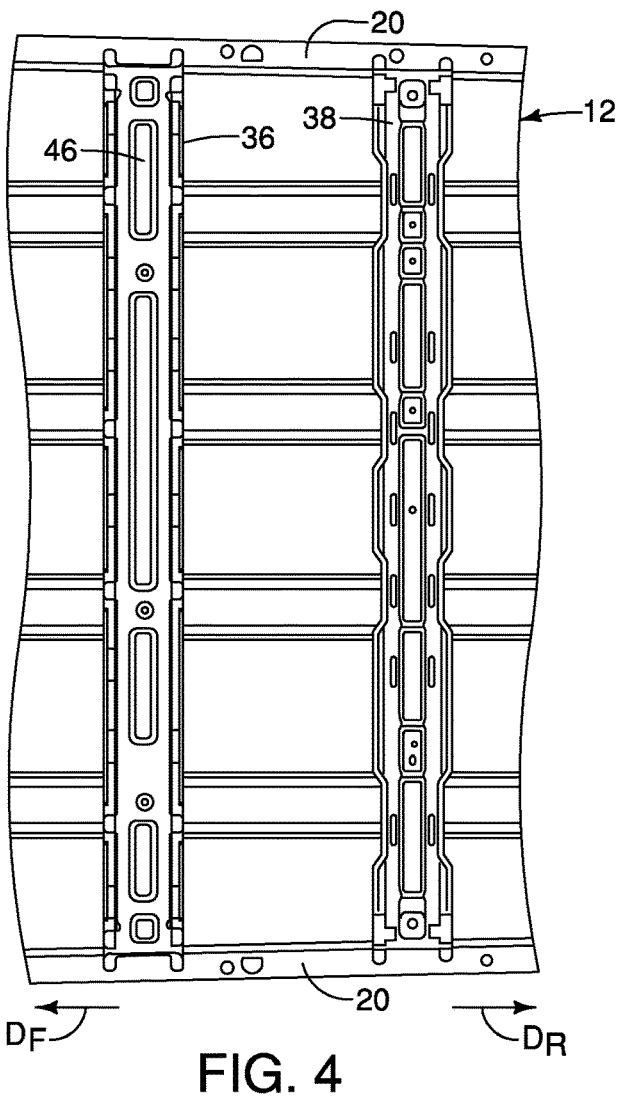
FIG. 4 is another top view of the roof structure showing only the two rearward-most roof bows in accordance with the exemplary embodiment.

FIG. 4 shows the roof bows 36 and 38, which are the two rearward-most ones of the roof bows 28, 30, 32, 34, 36 and 38 of the roof structure 12. By adding reinforcement to either one or both of the roof bows 36 and 38, the resonance frequency of the rearward area of the roof structure is altered and improved in order to reduce resonance frequency related noises, reduces the booming noises mentioned above, and, improves the drivability and feel of the vehicle 10.

Specifically, reinforcement to one or both of the roof bows 36 and 38, the overall structural rigidity of the vehicle 10 is improves and provides a more solid structural feel which improves the ride and handling of the vehicle 10.

It should be understood from the description herein below, that either one of the roof bow 36 or the roof bow 38 can be designed and assembled as described below. Hence, the description below of the roof bow 36 applies to either or both of the roof bows 36 and 38.

Figure 5:
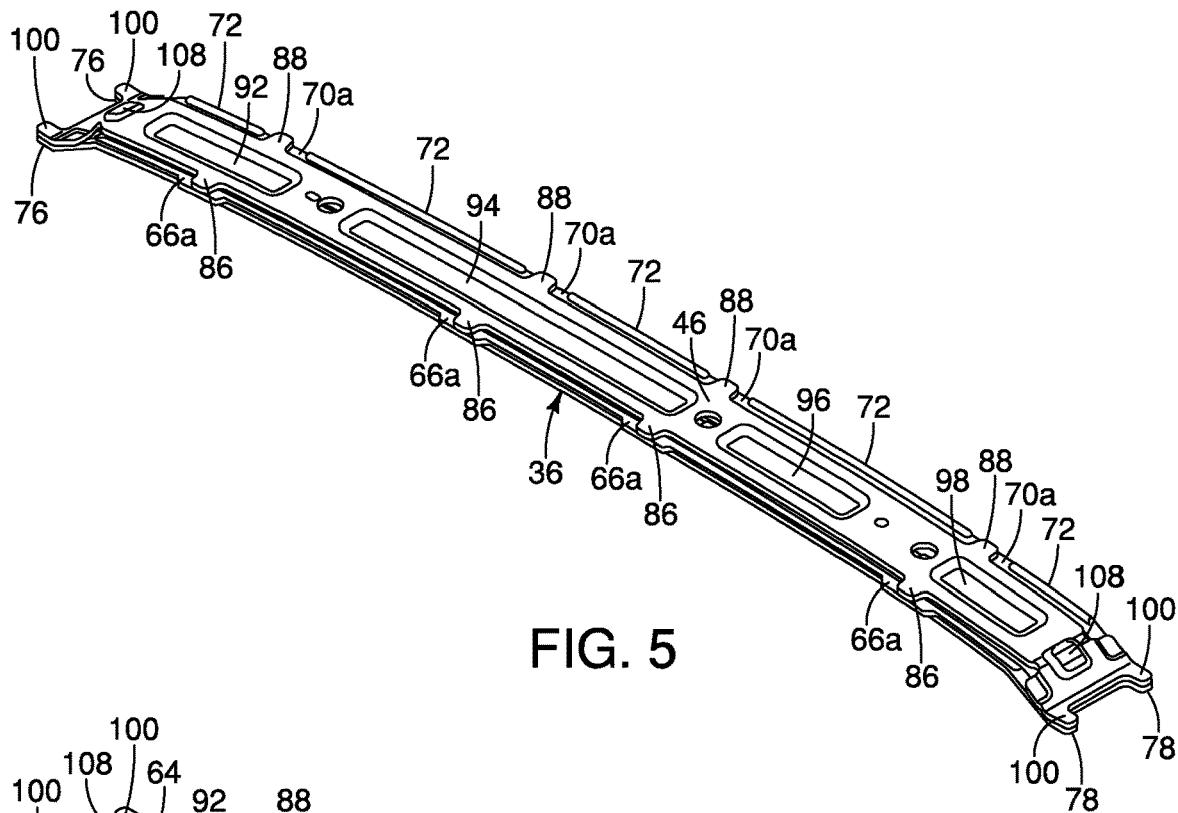
FIG. 5 is a perspective view of one of the rearward-most roof bows shown removed from the roof structure showing the roof bow and a stiffening member welded to the roof bow in accordance with the exemplary embodiment.
Figure 6:
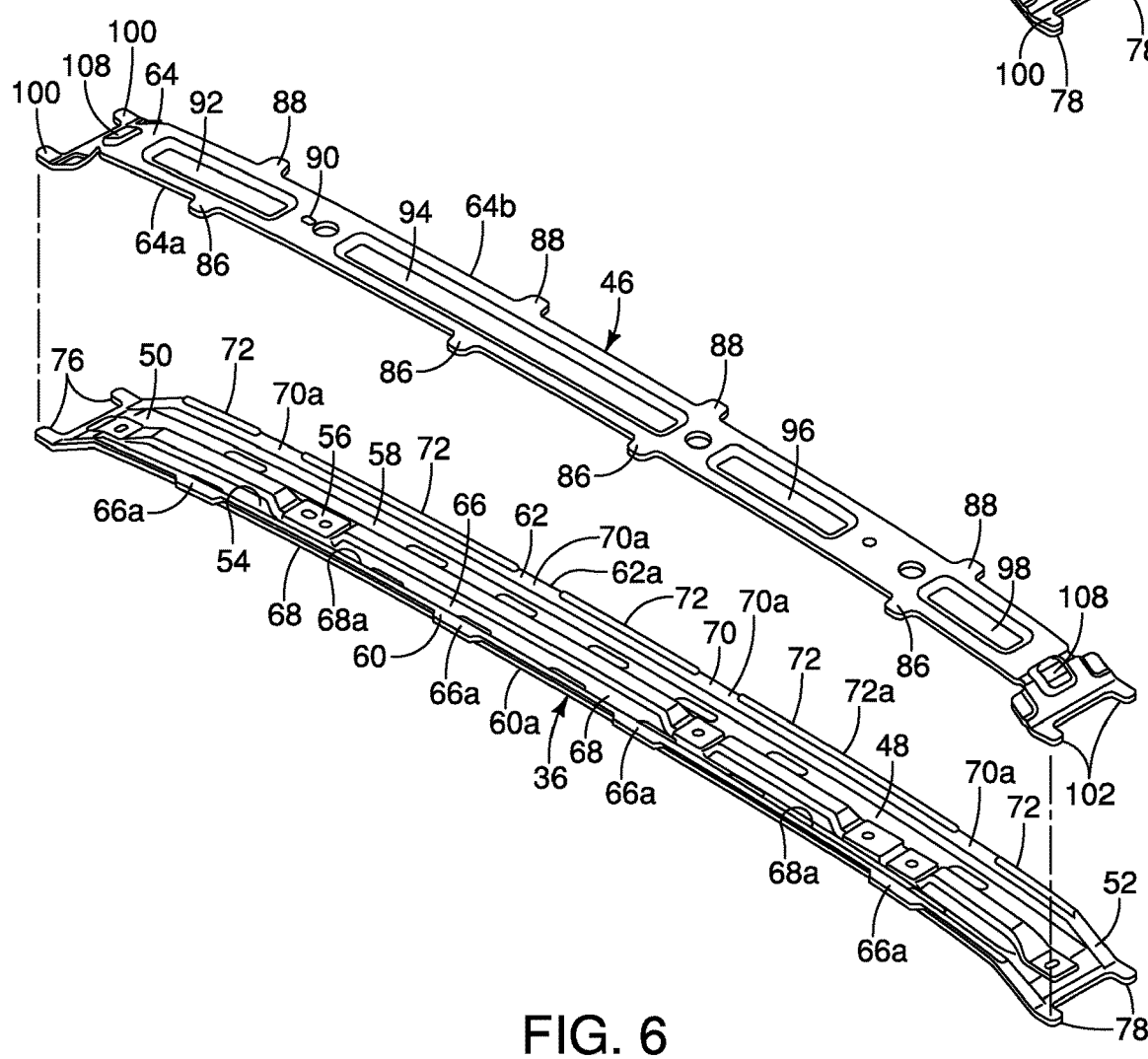
FIG. 6 is an exploded perspective view of the one of the rearward-most roof bows shown removed from the roof structure showing the roof bow and the stiffening member in accordance with the exemplary embodiment.
Figure 11:
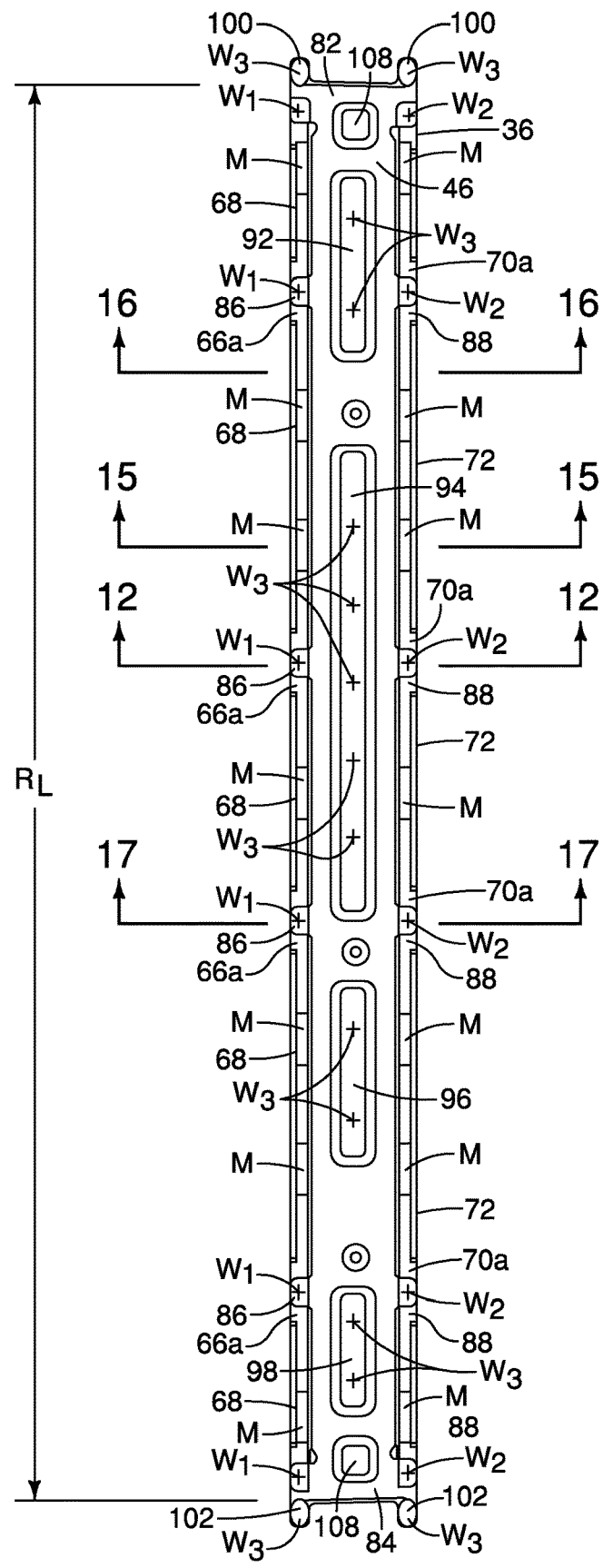
FIG. 11 is a top view the one of the rearward-most roof bows shown removed from the roof structure showing the roof bow and a stiffening member welded to one another in accordance with the exemplary embodiment.
Figures 12, 13:
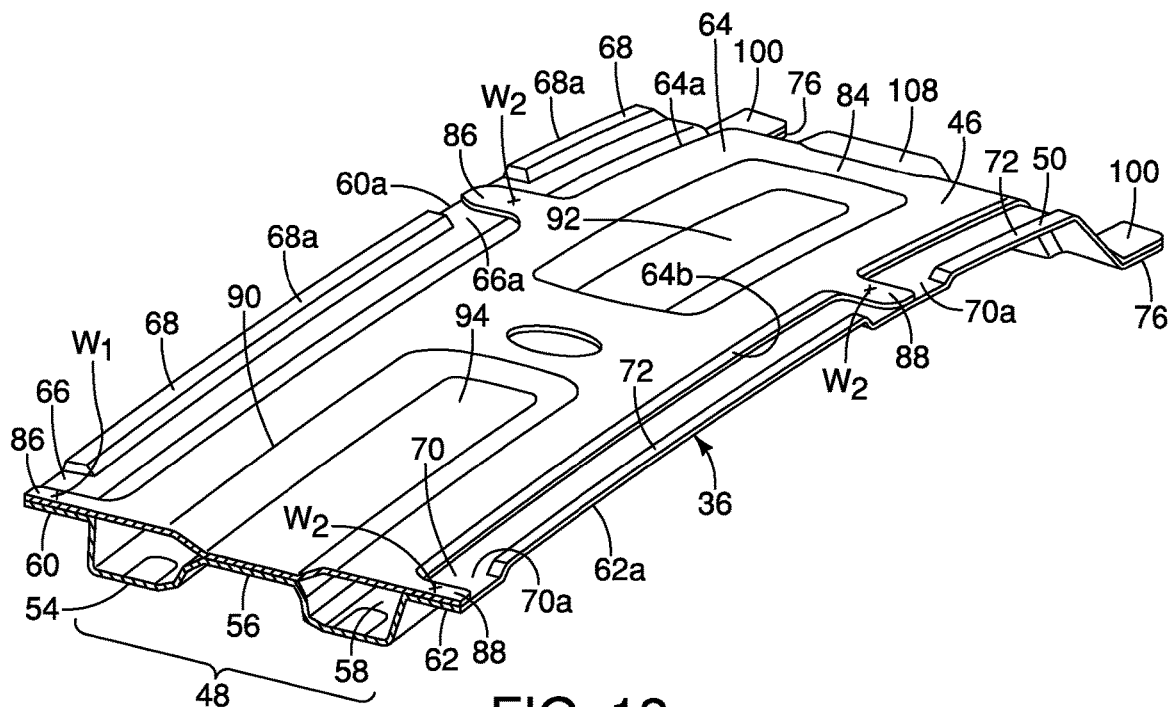
FIG. 12 is a perspective cross-sectional view of the roof bow and the stiffening member taken along the line 12-12 in FIG. 11 in accordance with the exemplary embodiment.
FIG. 13 is a perspective view of the second end of the roof bow and stiffening member, showing the attachment projections of the stiffening members overlaying and aligning with the second attachment projections of the roof bow prior to welding in accordance with the exemplary embodiment.
Figure 14:
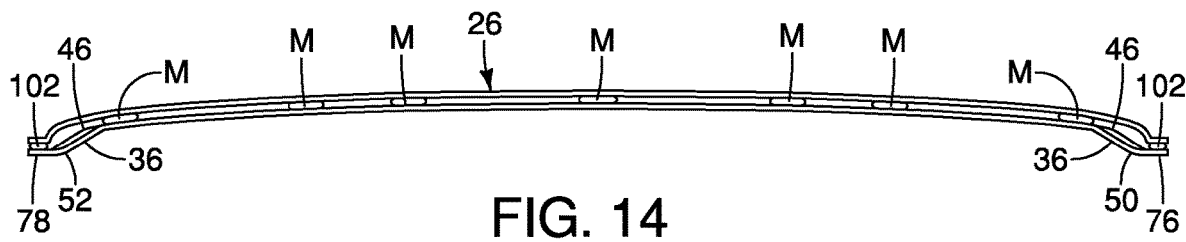
FIG. 14 is a side cross-sectional view of the one of the roof bows shown attached to the roof panel by mastic material in accordance with the exemplary embodiment.

Description is now provided for the roof bow 36 with specific reference to FIGS. 3-17. As shown in FIGS. 5, 6 and 11, the roof bow 36 includes a stiffening member 46, that is also described below.

Referring now to FIGS. 6-8, 11 and 15-17, the roof bow 36 has a main section 48 with a first end 50 and a second end 52. The main section 48 extends between and is supported to the pair of roof side rails 20 in a direction perpendicular to the vehicle longitudinal direction $D_L$.

Figure 7:
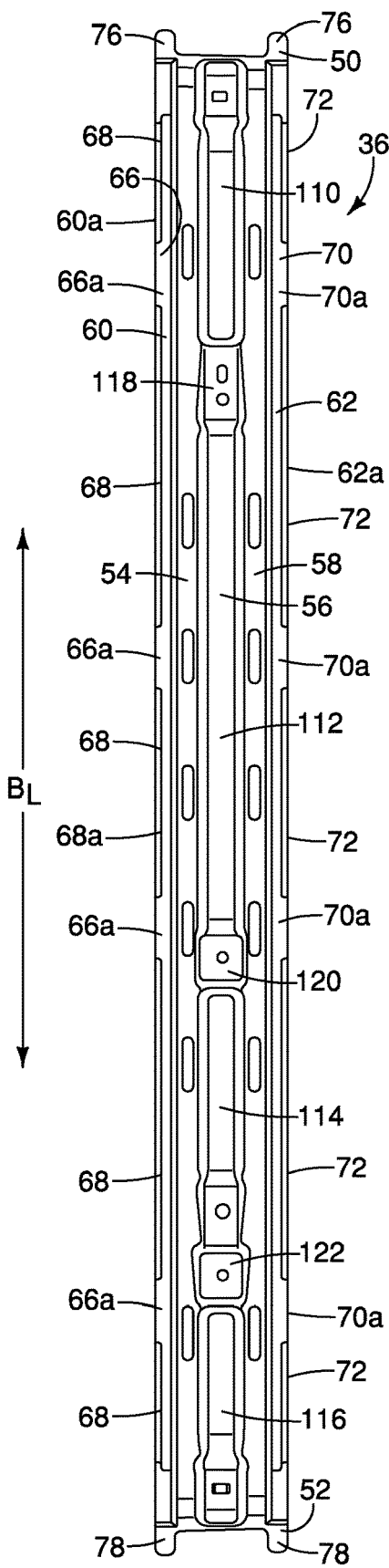
FIG. 7 a top view of the one of the rearward-most roof bows removed from the vehicle and with the stiffening member removed showing a forward flange section, a first recessed area, a middle section, a second recessed area and a rearward flange section of the roof rail in accordance with the exemplary embodiment.

As shown in FIG. 7, the roof bow 36 defines a lengthwise direction $B_L$ of the roof bow 36 that is perpendicular to the vehicle longitudinal direction $D_L$. As shown in FIG. 11, the roof bow 36 has a first overall length $R_L$ that is measured from the first end 50 to the second end 52 (measured perpendicular to the vehicle longitudinal direction $D_L$. The roof bow 36 also has a first overall width $R_W$ measured perpendicular to the first overall length $R_L$. The stiffening member 46 has approximately the same overall length as the roof bow 36.

The main section 48 of the roof bow 36 further includes a first recessed area 54, a middle section 56 and a second recessed area 58. The roof bow 36 also includes a forward flange section 60 and a rearward flange section 62. The forward flange section 60 extends in the vehicle forward direction DF from the main section 48, and the rearward flange section 62 extends in the vehicle rearward direction DR from the main section 48. The forward flange section 60 and the rearward flange section 62 extend in the lengthwise direction $B_L$ of the roof bow 36 between the first end 50 and the second end 52.

Figure 15:
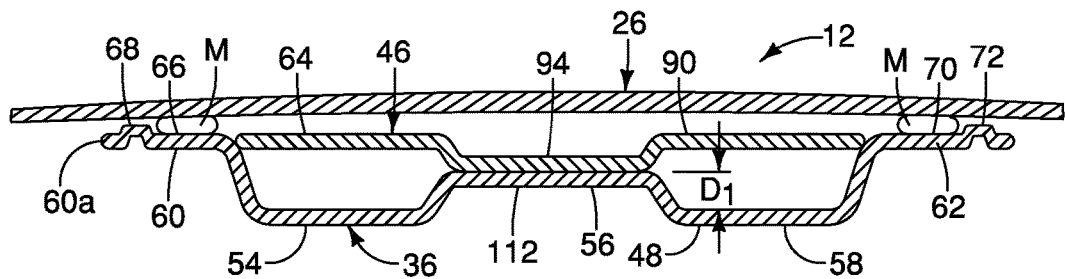
FIG. 15 is a cross-sectional view of the roof bow and the stiffening member taken along the line 15-15 in FIG. 11 in accordance with the exemplary embodiment.
Figure 16:
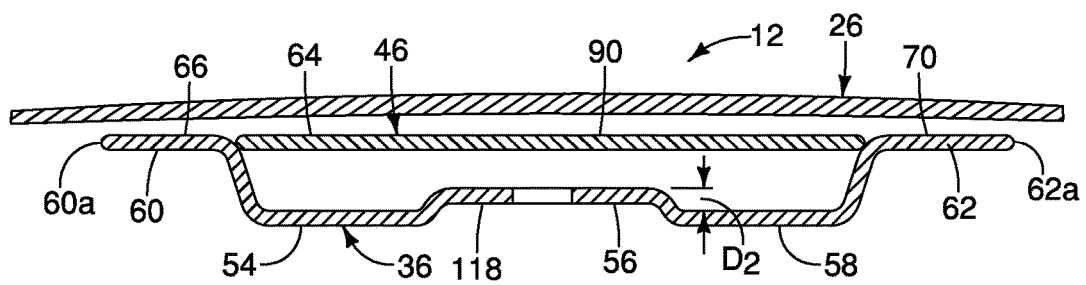
FIG. 16 is a cross-sectional view of the roof bow and the stiffening member taken along the line 16-16 in FIG. 11 in accordance with the exemplary embodiment.
Figure 17:
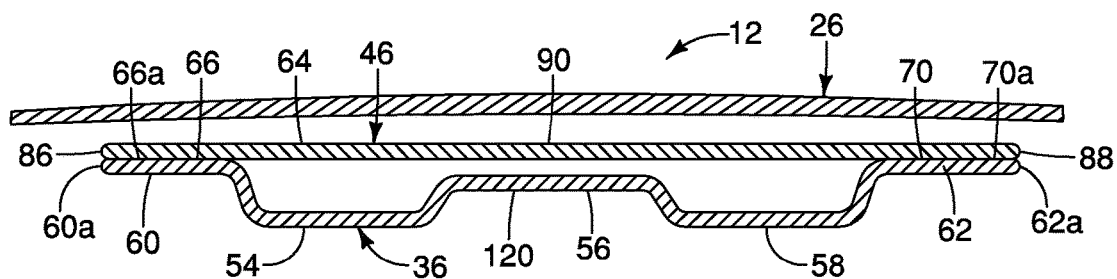
FIG. 17 is a cross-sectional view of the roof bow and the stiffening member taken along the line 17-17 in FIG. 11 in accordance with the exemplary embodiment.

As shown in FIGS. 12 and 15-17, the first recessed area 54 is located between the forward flange section 60 and the middle section 56. The second recessed area 58 is located between middle section 56 and the rearward flange section 58. Further, as shown in FIGS. 15-17, the first recessed area 54 and the second recessed area 58 are spaced apart from a panel portion 64 of the stiffening member 46. The panel portion 64 of the stiffening member 46 is described in greater detail below.

As shown in FIGS. 12 and 15-17, the first recessed area 54, the middle section 56 and the second recessed area 58 define an overall W-shape as viewed in cross-section.

Figure 8:
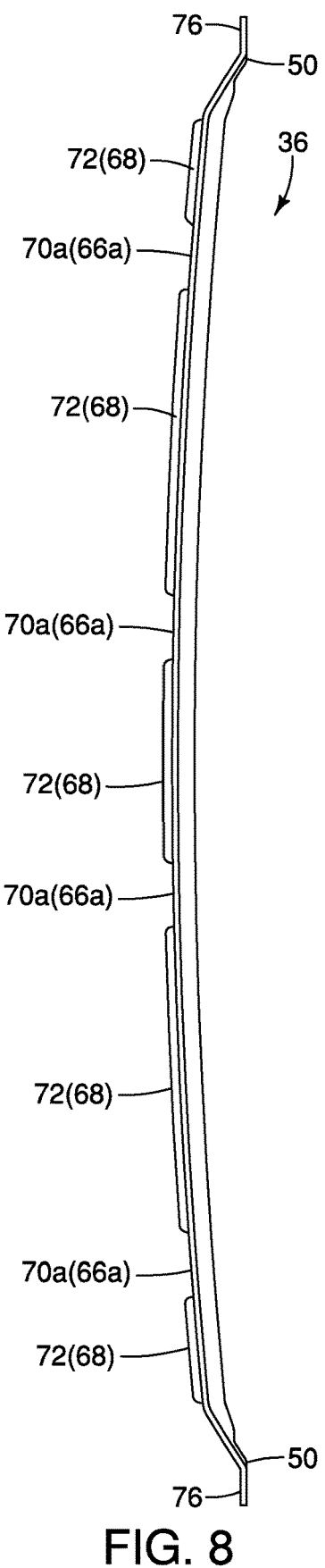
FIG. 8 a side view of the roof bow depicted in FIG. 6 in accordance with the exemplary embodiment.

As shown in FIGS. 6-8, the forward flange section 60 has an upper surface 66 that includes a plurality of first embossments 68 located along a forward edge 60a of the forward flange section 60. The first embossments 68 are spaced apart from one another along the upper surface 66. The first embossments 68 have upper surfaces 68a that are located above the upper surface 66 of the forward flange section 60. The upper surface 66 of the forward flange section 60 further includes a plurality of first flat sections 66a defined between adjacent ones of the first embossments 68.

Similarly, the rearward flange section 62 has an upper surface 70 that includes a plurality of second embossments 72 located along a rearward edge 62a of the rearward flange section 62. The second embossments 72 are spaced apart from one another along the upper surface 70. The second embossments 72 have upper surfaces 72a that are located above the upper surface 70 of the rearward flange section 62. The upper surface 70 of the rearward flange section 62 further includes a plurality of second flat sections 70a defined between adjacent ones of the second embossments 72.

The main section 48 of the roof bow 12 further includes a pair of first attachment projections 76 that extending from the first end 50 of the main section 48 of the roof bow 12. The main section 48 further includes a pair of second attachment projections 78 that extend from the second end 52 of the main section 48 of the roof bow 12. The pair of first attachment projections 76 and the pair of second attachment projections 78 are attached via welding techniques to respective ones of the roof side rails 20 beneath the roof ditches 40, as shown in FIG. 3.

Figure 9:
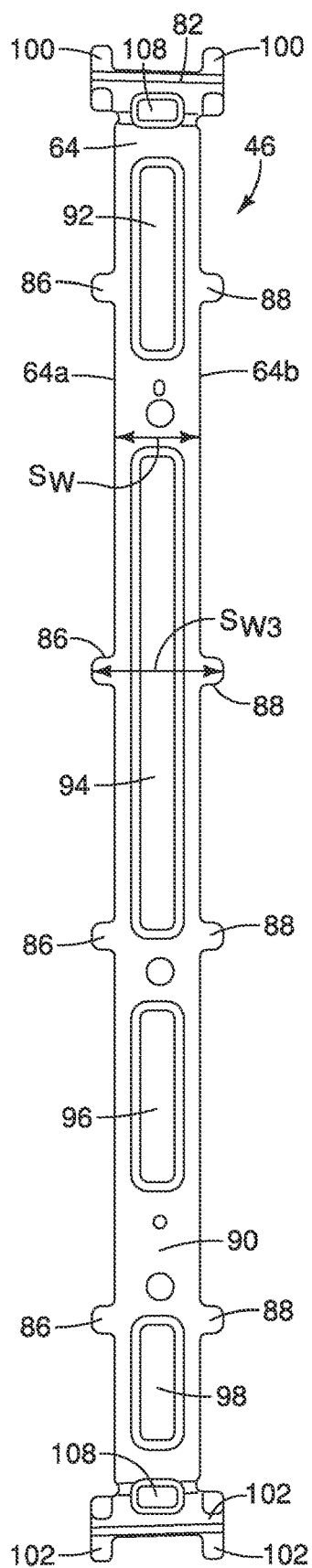
FIG. 9 a top view of stiffening member removed from the roof bow showing a plurality of forward projections prior to welding to the forward flange section of the roof bow depicted in FIGS. 7 and 8, a middle section, and a plurality of rearward projections prior to welding to the rearward flange section of the roof bow depicted in FIGS. 7 and 8, in accordance with the exemplary embodiment.
Figure 10:
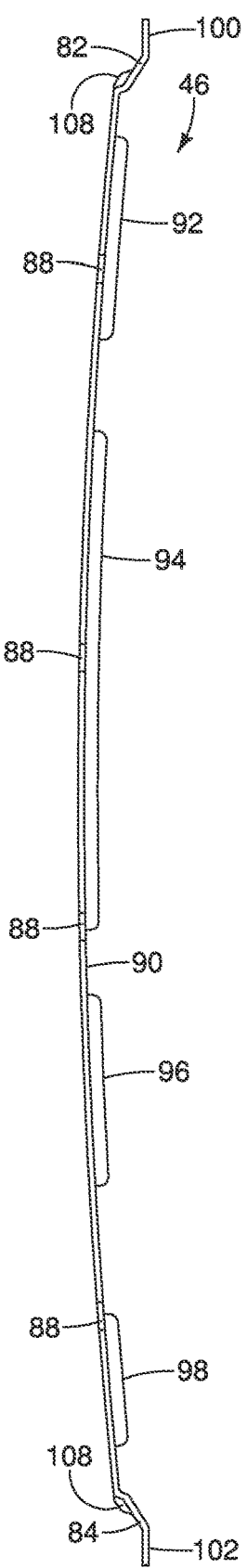
FIG. 10 a side view of the stiffening member depicted in FIG. 9 in accordance with the exemplary embodiment.

A description of the stiffening member 46 is now provided with reference to FIGS. 5, 6 and 9-17. The stiffening member 46 is a metallic panel provided with a slight curvature to correspond to the overall shape of the roof structure 12. The stiffening member 46 basically includes the panel portion 64 that defines a first end 82 and a second end 84. The panel portion 64 further includes a plurality of forward projections 86 that extend in the vehicle forward direction DF from a forward edge 64a of the panel portion 64 at first predetermined locations and a plurality of rearward projections 88 that extend from a rearward edge 64b of the panel portion 64 at second predetermined locations. In other words, the forward projections 86 define the first predetermined location and the rearward projections 88 define the second predetermined locations. As shown in FIG. 9, the panel portion 64 of the stiffening member 46 has a second overall width $S_W$ that is less than the first overall width. Further, the stiffening member 46 also has a third overall width $S_{W3}$ measured from the forward projections 86 to the rearward projections 88. As shown in FIG. 9, the third overall width $S_{W3}$ that is greater than the second overall width $S_W$.

As shown in FIGS. 5 and 11, the plurality of forward projections 86 are spaced apart from one another with approximately the same spacing between the first flat section 66a of the upper surface 66 of the forward flange section 60 of the roof bow 36. Further, when the stiffening member 46 is installed to the roof bow 36, the plurality of forward projections 86 are welded via welds $W_1$ to corresponding portions of the first flat section 66a of the upper surface 66 of the forward flange section 60 of the roof bow 36.

Similarly, the plurality of rearward projections 88 are spaced apart from one another with approximately the same spacing between the second flat section 70a of the upper surface 70 of the rearward flange section 62 of the roof bow 36. Further, when the stiffening member 46 is installed to the roof bow 36, the plurality of rearward projections 88 are welded via welds $W_2$ to corresponding portions of the second flat section 70a of the upper surface 70 of the rearward flange section 62 of the roof bow 36.

As shown in FIGS. 5, 6 and 9-17, the panel portion 64 of the stiffening member 46 has a central section 90 that includes concaved areas 92, 94, 96 and 98. The concaved areas 92, 94, 96 and 98 are spaced apart from one another relative to the lengthwise direction of the panel portion 64.

The first end 82 of the panel portion 64 of the stiffening member 46 includes a pair of attachment projections 100. The second end 84 of the panel portion 64 of the stiffening member 46 includes a pair of attachment projections 102, as shown in FIG. 9. As shown in FIG. 3, the attachment projections 100 overlay the first attachment projections 76 of the first end 50 of the roof bow 36 beneath panels that define the roof ditch 40. The first attachment projections 76, the attachment projections 100 and the panels that define the roof ditch 40 are welded together via welds $W_3$. Although not shown, the second attachment projections 78 at the second end 52 of the roof bow 36, the attachment projections 102 at the second end 84 of the stiffening member 46 and the panels that define the roof ditch 40 at the opposite end of the roof structure 14 are welded together via additional welds $W_3$.

As shown in FIG. 7, the middle section 56 of the roof bow 36 has a plurality of first convex embossment areas 110, 112, 114 and 116, and a plurality of second convex embossment areas 118, 120 and 122. Upper surfaces of the first convex embossment areas 110, 112, 114 and 116 are located a first distance $D_1$ above the upper surfaces of the first and second recessed areas 54 and 58. The plurality of second convex embossment areas 118, 120 and 122 are located a second distance $D_2$ above the upper surfaces of the first and second recessed areas 54 and 58, where the first distance $D_1$ is greater than the second distance $D_2$, as shown in FIGS. 15 and 16.

As shown in FIG. 7, at a plurality of predetermined locations that are spaced part from one another, the concaved areas 92, 94, 96 and 98 of the stiffening member 46 are welded to the first convex embossment areas 110, 112, 114 and 116 of the roof bow 36 via welds $W_3$. Consequently, as shown in FIG. 15, As shown in FIG. 15, the concaved areas 92, 94, 96 and 98 of the stiffening member 46 and the first convex embossment areas 110, 112, 114 and 116 of the roof bow 36 contact one another and are held against one another due to the inclusion of the welds $W_3$. However, as shown in FIGS. 16 and 17, in the areas between the concaved areas 92, 94, 96 and 98 of the stiffening member 46, areas of the central portion 90 of the stiffening member 46 are spaced apart from the second convex embossment areas 118, 120 and 122 of the middle section 56 of the roof bow 36.

As shown in FIGS. 15 and 16, with the stiffening member 46 attached to (welded) to the roof bow 36, the central section 90 of the stiffening member 46 is located between the forward flange section 60 and the rearward flange section 62 of the roof bow 36.

When the roof panel 26 is installed to the roof structure 12, and in particular to the roof bow 36, the roof bow 36 is provided with an adhesive or mastic material M at predetermined locations rearward of and adjacent to the first embossments 68 of the forward flange section 60, as shown in FIGS. 11-13 and 15. Simultaneously, the roof bow 36 is provided with the adhesive or mastic material M at predetermined locations forward of and adjacent to the second embossments 72 of the rearward flange section 62. When applied, the mastic M is a soft paste or caulk-like material that is easily compress and is therefore pliable. The inclusion of the first embossments 68 of the forward flange section 60 and the second embossments 72 of the rearward flange section 62 assists in retaining the mastic M in the desired location along the upper surface 66 of the forward flange section 60 and the upper surface 70 of the rearward flange section 62.

Thus, in addition to welds within the roof ditches 40, the mastic material M fixes the roof panel 26 in position. Further, one cured, the mastic M provides a strong bond between the roof panel 26 and the roof bow 36. As a result, resonance frequencies of a rearward portion of the roof panel 26 and the overall roof structure 12 are attenuated. Further, swaying motion experience when turning corners with the vehicle 10 in motion is reduced providing the vehicle 10 with improved handling and improving overall turning and lane changing responses.

Further, since the stiffening member 46 is welded to the forward flange section 60 and the rearward flange section 62 of the roof bow 36 at spaced apart locations, the roof bow 36 has improved strength and rigidity, resisting flexing during normal operations of the vehicle 10.

The various structures of the vehicle 10 (other than the roof structure 12) are conventional components that are well known in the art. Since these structures and features of the vehicle 10 are well known in the art, these structures will not be discussed or illustrated in detail herein. Rather, it will be apparent to those skilled in the art from this disclosure that the components can be any type of structure and/or programming that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment, the following directional terms "forward", "rearward", "above", "downward", "vertical", "horizontal", "below" and "transverse" as well as any other similar directional terms refer to those directions of a vehicle equipped with the vehicle roof structure. Accordingly, these terms, as utilized to describe the present invention should be interpreted relative to a vehicle equipped with the vehicle roof structure.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle roof structure, comprising:
a roof bow configured for attachment to a vehicle, the roof bow having a main section with a first end and a second end, a first overall length being measured from the first end to the second end and a first overall width being measured perpendicular to the first overall length, the main section having a forward flange section, a rearward flange section and a middle section that extend in a lengthwise direction of the roof bow between the first end and the second end, where forward and rearward directions are defined relative to a forward and rearward directions of the vehicle; and
a stiffening member having a panel portion with a first end and a second end, the panel portion of the stiffening member having a second overall length being measured from the first end to the second end that is approximately equal to the first overall length and the panel portion of the stiffening member having a second overall width being measured perpendicular to the second overall length, the first overall width of the roof bow being greater than the second overall width of the panel portion of the stiffening member,
the panel portion having a plurality of forward projections extending from a forward edge of the panel portion at corresponding first predetermined locations and a plurality of rearward projections extending from a rearward edge of the panel portion at corresponding second predetermined locations, the plurality of forward projections being fixedly attached to the forward flange section of the roof bow, the plurality of rearward projections being fixedly attached to the rearward flange section of the roof bow such that the panel portion of the stiffening member is located between the forward flange section and the rearward flange section of the roof bow, the stiffening member having a third overall width measured from the plurality of forward projections to the rearward projections that is greater than the second overall width, and
the panel portion of the stiffening member has a central area that is fixedly attached to the middle section at predetermined spaced apart locations.

2. The vehicle roof structure according to claim 1, wherein
the forward flange section of the roof bow includes a plurality of first flat sections at locations corresponding to the first predetermined locations of the plurality of forward projections of the stiffening member with the plurality of forward projections of the stiffening member being welded to corresponding ones of the plurality of flat sections of the forward flange section of the roof bow, and the rearward flange section of the roof bow includes a plurality of second flat sections at locations corresponding to the second predetermined locations of the plurality of rearward projections of the stiffening member with the plurality of rearward projections of the stiffening member being welded to corresponding ones of the plurality of second flat sections of the rearward flange section of the roof bow.

3. The vehicle roof structure according to claim 1, wherein
sections of the panel portion of the stiffening member are spaced apart from the middle section of the roof bow.

4. A vehicle roof structure comprising:
a roof bow configured for attachment to a vehicle, the roof bow having a main section with a first end and a second end, a first overall length being measured from the first end to the second end and a first overall width being measured perpendicular to the first overall length, the main section having a forward flange section, a rearward flange section and a middle section that extend in a lengthwise direction of the roof bow between the first end and the second end, where forward and rearward directions are defined relative to a forward and rearward directions of the vehicle; and
a stiffening member having a panel portion with a first end and a second end, the panel portion of the stiffening member having a second overall length being measured from the first end to the second end that is approximately equal to the first overall length and the panel portion of the stiffening member having a second overall width being measured perpendicular to the second overall length, the first overall width of the roof bow being greater than the second overall width of the panel portion of the stiffening member,
the panel portion having a plurality of forward projections extending from a forward edge of the panel portion at corresponding first predetermined locations and a plurality of rearward projections extending from a rearward edge of the panel portion at corresponding second predetermined locations, the plurality of forward projections being fixedly attached to the forward flange section of the roof bow, the plurality of rearward projections being fixedly attached to the rearward flange section of the roof bow such that the panel portion of the stiffening member is located between the forward flange section and the rearward flange section of the roof bow, the stiffening member having a third overall width measured from the plurality of forward projections to the rearward projections, a plurality of first sections of the panel portion of the stiffening member spaced apart from the middle section of the roof bow, and a plurality of second sections of the panel portion of the stiffening member are attached to the middle section of the roof bow.

5. The vehicle roof structure according to claim 4, wherein
the central section of the panel portion of the stiffening member includes a plurality of concaved areas spaced apart from one another relative to the lengthwise direction of the stiffening member, the concaved areas defining the plurality of second sections of the panel portion.

6. The vehicle roof structure according to claim 5, wherein
the main section of the roof bow includes a first recessed area and a second recessed area that extend in the lengthwise direction of the roof bow, the first recessed area being located between the forward flange section and the middle section and the second recessed area being located between middle section and the rearward flange section such that the first recessed area and the second recessed area are spaced apart from the panel portion of the stiffening member.

7. The vehicle roof structure according to claim 6, wherein
the first recessed area, the middle section and the second recessed area define an overall W-shape as viewed along a cross-section thereof such that upper surfaces of the middle section are located a first distance above an upper surfaces of the first and second recessed areas.

8. The vehicle roof structure according to claim 7, wherein
the middle section includes embossments with upper surfaces that are located a second distance above the upper surfaces of the first and second recessed areas, where the first distance is greater than the second distance.

9. The vehicle roof structure according to claim 1, wherein
the main section of the roof bow further includes a pair of first attachment projections extending from the first end of the main section of the roof bow, and, a pair of second attachment projections extending from the second end of the main section of the roof bow, the pair of first attachment projections and the pair of second attachment projections being configured for attachment to respective roof side rails of the vehicle.

10. The vehicle roof structure according to claim 1, wherein
the forward flange section includes a plurality of first embossments located along a forward edge of the forward flange section, with upper surfaces of the plurality of embossments located above an upper surface of the forward flange section, and,
the rearward flange section includes a plurality of second embossments located along a rearward edge of the rearward flange section, with upper surfaces of the plurality of second embossments located above an upper surface of the rearward flange section.

11. A vehicle roof structure, comprising:
a pair of roof side rails extending in a vehicle longitudinal direction, the pair of roof side rails at least partially defining a roof ditch;
a roof bow having a main section with a first end and a second end, the main section extending between and supported to the pair of roof side rails in a direction perpendicular to the vehicle longitudinal direction, the main section having a forward flange section, a rearward flange section and a middle section that extend in a lengthwise direction of the roof bow between the first end and the second end; and
a stiffening member having a panel portion with a first end and a second end, the panel portion having a plurality of forward projections extending from a forward edge of the panel portion at corresponding first predetermined locations and a plurality of rearward projections extending from a rearward edge of the panel portion at corresponding second predetermined locations, the plurality of forward projections being fixedly attached to the forward flange section of the roof bow, the plurality of rearward projections being fixedly attached to the rearward flange section of the roof bow such that the panel portion of the stiffening member is located between the forward flange section and the rearward flange section of the roof bow, the panel portion of the stiffening member having a central area that is fixedly attached to the middle section at predetermined spaced apart locations and sections of the panel portion of the stiffening member are spaced apart from the middle section of the roof bow.

12. The vehicle roof structure according to claim 11, wherein
the forward flange section of the roof bow includes a plurality of first flat sections at locations corresponding to the first predetermined locations of the plurality of forward projections of the stiffening member with the plurality of forward projections of the stiffening member being welded to corresponding ones of the plurality of flat sections of the forward flange section of the roof bow, and
the rearward flange section of the roof bow includes a plurality of second flat sections at locations corresponding to the second predetermined locations of the plurality of rearward projections of the stiffening member with the plurality of rearward projections of the stiffening member being welded to corresponding ones of the plurality of second flat sections of the rearward flange section of the roof bow.

13. The vehicle roof structure according to claim 11, wherein
the main section of the roof bow further includes a pair of first attachment projections extending from the first end of the main section of the roof bow, and, a pair of second attachment projections extending from the second end of the main section of the roof bow, the pair of first attachment projections and the pair of second attachment projections being to respective ones of the roof side rails.

14. The vehicle roof structure according to claim 11, wherein
the forward flange section includes a plurality of first embossments located along a forward edge of the forward flange section, with upper surfaces of the plurality of embossments located above an upper surface of the forward flange section,
the rearward flange section includes a plurality of second embossments located along a rearward edge of the rearward flange section, with upper surfaces of the plurality of second embossments located above an upper surface of the rearward flange section, and
the forward flange section and the rearward flange section being provided with sections of an adhesive or mastic material applied to areas thereof adjacent to the plurality of first embossments and the plurality of second embossments thereby fixing the roof bow to a roof panel installed above the roof bow, the roof panel further being attached to the roof side rails proximate the roof ditch.

15. The vehicle roof structure according to claim 11, wherein
a plurality of first sections of the panel portion of the stiffening member are spaced apart from the middle section of the roof bow, and
a plurality of second sections of the panel portion of the stiffening member are attached to the middle section of the roof bow.

16. The vehicle roof structure according to claim 15, wherein
the central section of the panel portion of the stiffening member includes a plurality of concaved areas spaced apart from one another relative to the lengthwise direction of the stiffening member, the concaved areas defining the plurality of second sections of the panel portion.

17. The vehicle roof structure according to claim 16, wherein
the main section of the roof bow includes a first recessed area and a second recessed area that extend in the lengthwise direction of the roof bow, the first recessed area being located between the forward flange section and the middle section and the second recessed area being located between middle section and the rearward flange section such that the first recessed area and the second recessed area are spaced apart from the panel portion of the stiffening member.

18. The vehicle roof structure according to claim 17, wherein
the first recessed area, the middle section and the second recessed area define an overall W-shape as viewed along a cross-section thereof such that upper surfaces of the middle section are located a first distance above an upper surfaces of the first and second recessed areas, and the middle section includes embossments with upper surfaces that are located a second distance above the upper surfaces of the first and second recessed areas, where the first distance is greater than the second distance.

\* \* \* \* \*